United States Patent [19]
Fedor et al.

[11] 3,732,968
[45] May 15, 1973

[54] APPARATUS FOR ORIENTING MATERIAL

[75] Inventors: James R. Fedor; Christopher E. Christie, both of Akron, Ohio

[73] Assignee: The Goodyear Tire & Rubber Company, Akron, Ohio

[22] Filed: Aug. 11, 1971

[21] Appl. No.: 170,685

[52] U.S. Cl. ............................................. 198/33 AB
[51] Int. Cl. ............................................. B65g 47/24
[58] Field of Search ........................... 198/33 AB, 29; 214/1 Q; 83/418, 421

[56] References Cited
UNITED STATES PATENTS 3,432,023   3/1969   Lucas.............................198/33 AB Primary Examiner—Edward A. Sroka
Attorney—F. W. Brunner, et al.

[57] ABSTRACT

A machine for properly aligning unoriented pieces of defective tread stock for movement through a tread slitter where the different tread and sidewall rubber compounds are separated and returned to the extruder for reuse. The machine includes a pair of pointed awls which act as pivots around which the piece of tread stock is rotated into properly aligned relation for passage through the tread slitter.

17 Claims, 4 Drawing Figures

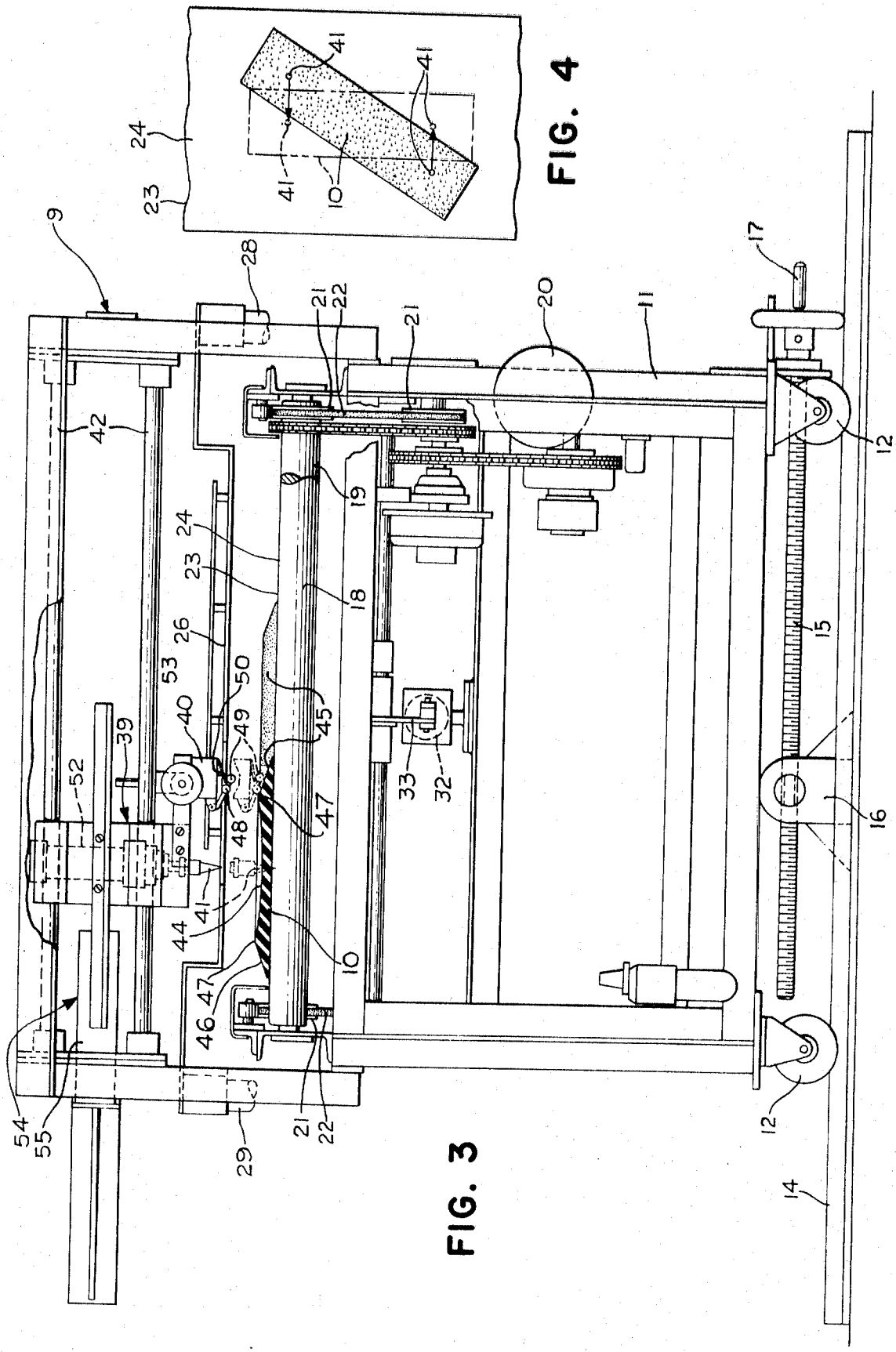

APPARATUS FOR ORIENTING MATERIAL

BACKGROUND OF THE INVENTION

Rubber compounds used to form the tread and sidewalls of pneumatic tires are extruded into a continuous band or ribbon which is cut into desired lengths for placement around an uncured tire carcass formed on a tire building machine. Sometimes the cut pieces of tread stock are defective and must be discarded. The rubber compounds are reuseable and can be returned to the extruder for forming new strips. However, the rubber compounds forming the tread and sidewalls are different and must be separated before they are returned to the extruder. This is accomplished by passing the tread stock through a machine having knives for cutting and separating the center portion of tread rubber from the side or lateral portions of sidewall rubber. An operator takes the individual pieces from a feed conveyor or other storage device and separately aligns them for movement through the tread slitter. This operation is expensive and time consuming, and it is desirable to have a machine for automatically oriented pieces of tread stock for movement through the tread slitter. The invention is directed to such a machine.

Briefly stated, the invention is in a machine and consequent method for aligning elongated pieces of material having a defineable and alignable physical characteristic. The machine or apparatus comprises a conveyor for supporting a piece of such material as it moves through the apparatus. A pair of clamps are provided for holding the material in clamped relation on the conveyor. The clamps are parallel and angularly disposed to the longitudinal axis of the conveyor. A pair of sensors are separately movable along parallel axes which are also angularly disposed to the longitudinal axis of the conveyor. The sensors are used for sensing the physical characteristic of the material. A pair of awls are movable, in unison, with the sensors and are equally spaced therefrom. Means are provided for plunging the awls into striking and piercing relation with the piece of material after the sensors locate the physical characteristic. Means are supplied for moving the awls individually to positions which are in aligned parallel relation to the longitudinal axis of the conveyor. The material, punctured and carried by the awls, is consequently rotated about the awls to a predetermined position where it is in parallel relation to the longitudinal axis of the conveyor. Means are provided for retracting the awls from the piece of material after it is properly oriented on the conveyor.

DESCRIPTION OF THE DRAWING

The following description of the drawing will be better understood by having reference to the annexed drawing, wherein:

FIG. 3 is an end view of the machine; and

FIG. 4 is a schematic view showing in exaggeration how an unoriented piece of tread stock is rotated to a properly aligned position for passage through an adjacent tread slitter.

DESCRIPTION OF THE INVENTION

Figure 1:
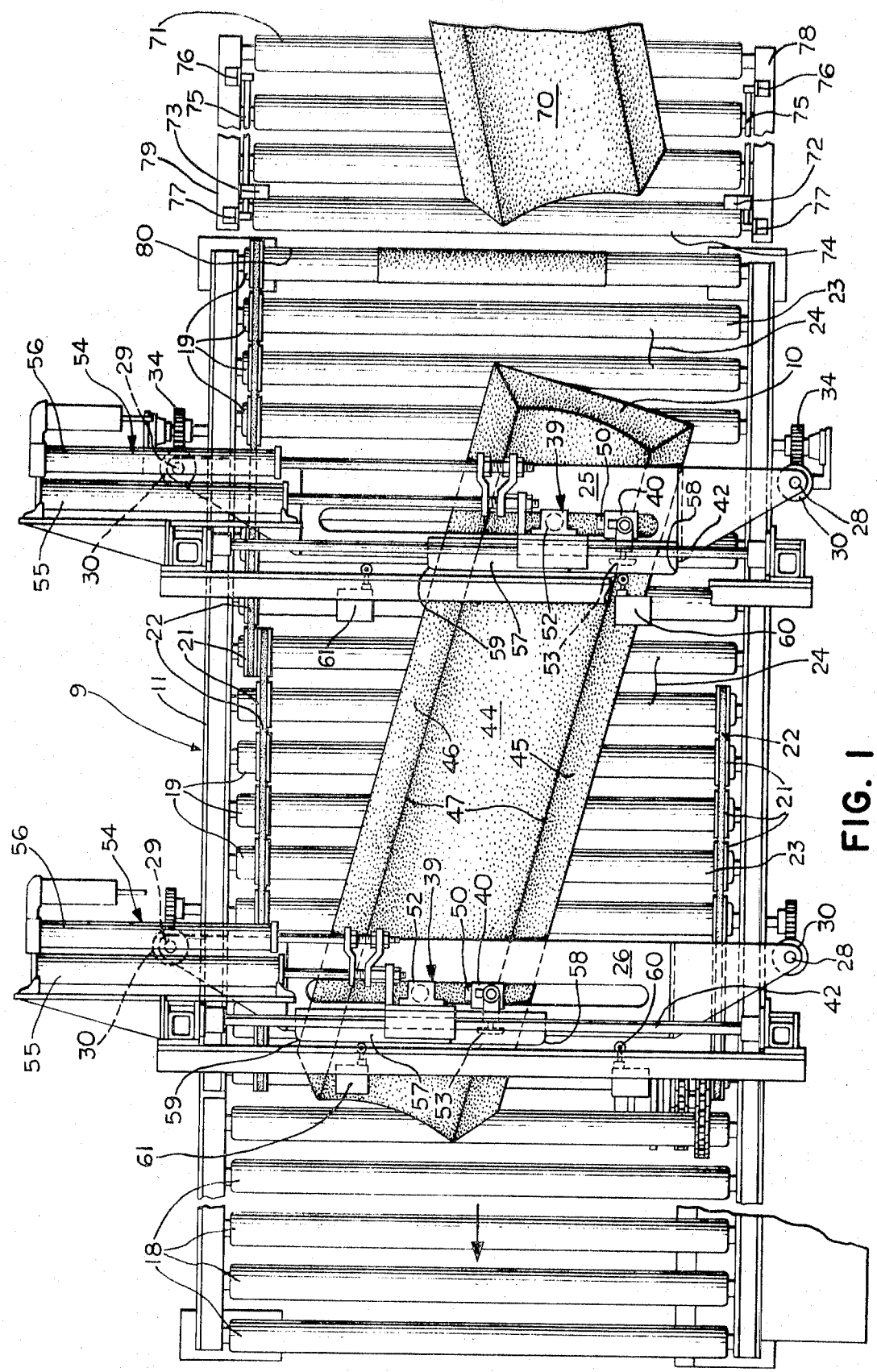
FIG. 1 is a plan view of a machine made in accordance with the invention.
Figure 2:
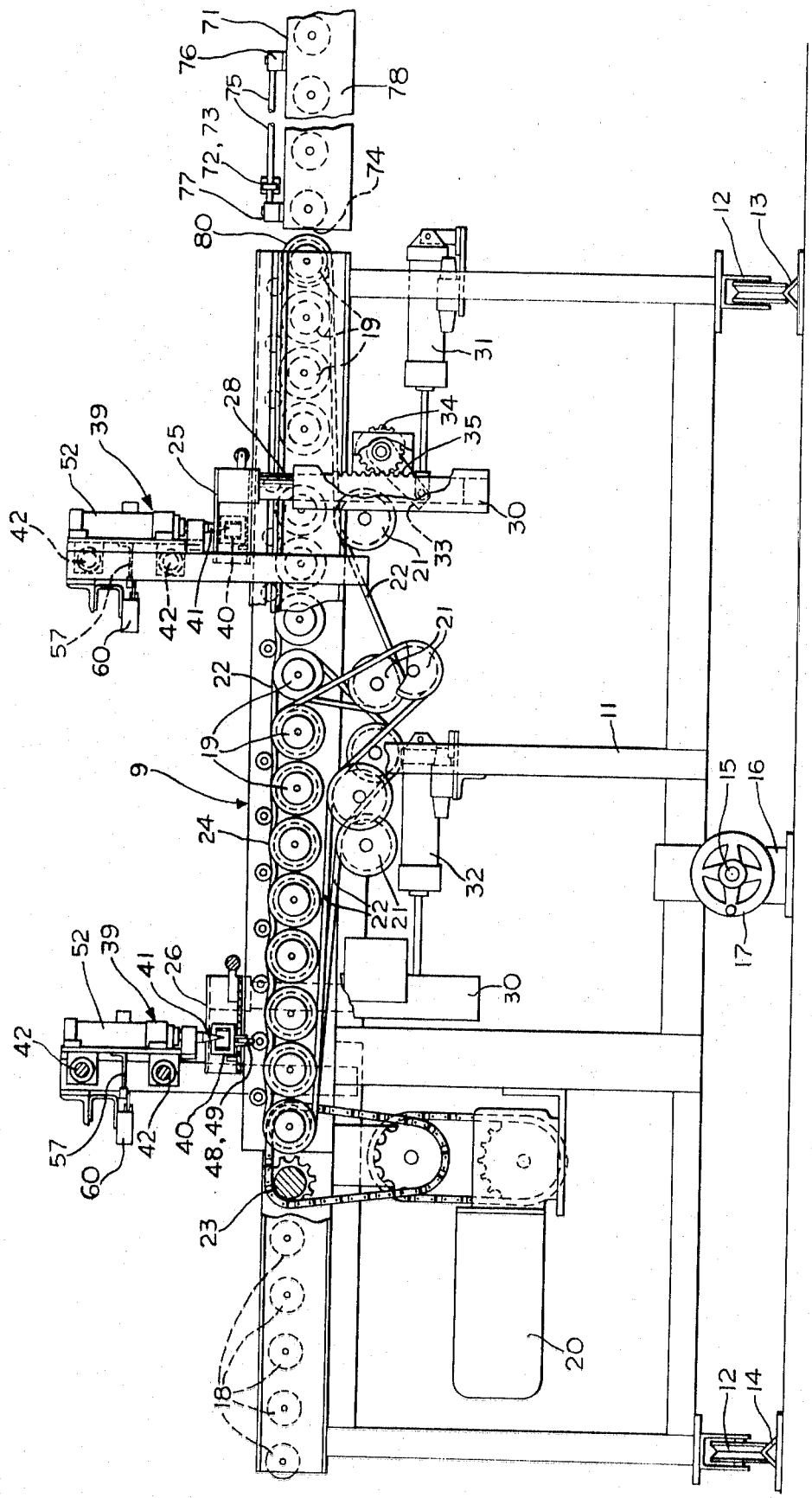
FIG. 2 is a side view of the machine.

Referring generally to FIGS. 1–3, there is shown a machine or apparatus 9 for orienting pieces of tread stock 10 which are not properly aligned for passage through an adjacent tread slitter (not shown). The apparatus 9 comprises a carrier frame 11 which is movable laterally relative to the axis along which the tread stock 10 moves through the adjacent tread slitter. The carrier frame 11 is mounted on a number of casters 12 movable along a pair of guide rails 13 and 14 which are disposed in parallel relation adjacent the tread slitter and normal to the longitudinal axis along which the tread stock moves through the tread slitter, which axis coincides with the longitudinal axis of the tread slitter. A drive screw 15 is coupled between the carrier frame 11 and a bracket 16 which is firmly anchored between the guide rails 13 and 14. A hand-operated crank 17 is used for rotating the drive screw 15 to move the carriage frame 11 along the guide rails 13 and 14, thereby laterally positioning the apparatus 10 relative to the longitudinal axis of the adjacent tread slitter.

A group of idler rollers 18 and power-driven rollers 19 are mounted in tandem, planar aligned relation on the carrier frame 11. The power-driven rollers 19 are operated by any suitable power transmission means, e.g., an electric motor 20, for driving a series of pulleys 21 and belts 22 reeved partially around the rollers 19. The idler rollers 18 and power-driven rollers 19 form a conveyor 23 having a bed 24 on which pieces of defective tread stock 10 are supported as they are fed through the aligning apparatus 9.

A pair of clamps 25 and 26 are disposed in parallel relation above the feed conveyor 23. The clamps 25 and 26 extend transversely across the conveyor bed 24 in the area of the drive rollers 19. The clamps 25 and 26 are preferably normal, or at right angles to the longitudinal axis of the feed conveyor 23. The clamps 25 and 26 are each secured to a pair of parallel guide rods 28 and 29 which are slidable in similar guide brackets 30 disposed on either side of the feed conveyor 23. A pair of air cylinders 31 and 32 are used to operate or raise and lower the clamps 25 and 26 from the conveyor bed 24. The air cylinders 31 and 32 are each coupled to a pivot arm 33 for rotating a toothed pinion 34 which is in meshing, driving engagement with a toothed rack 35 on each of the clamp rods 28 and 29. Thus, the air cylinders 31 and 32 are actuated to operate the rack and pinion mechanism which, in turn, moves the clamps 25 and 26 towards and away from the conveyor bed 24 to compressively engage and hold pieces of tread stock 10 in stationary relation against the feed conveyor 23 when the conveyor is stopped and not in operation.

An assembly 39 for locating and pinning the piece of tread stock 10 on the feed conveyor 23 when the rollers are stopped and not rotating, hereinafter referred to as an L-P assembly 39, is associated with each of the clamps 25 and 26. Each of the L-P assemblies 39 essentially comprises a sensor 40 and a pinning device, such as a sharply pointed awl 41, which are mounted for unitary movement along a trackway which, in this case, comprises a pair of guide bars 42 disposed in parallel relation above the associated clamp member. The sensors 40 move independently of each other along their separate trackways 42.

The piece of tread stock 10 is shown in cross-section in FIG. 3 and essentially comprises a tread portion 44 and tapering sidewall portions 45 and 46 which converge toward the intermediate tread portion 44. What might be termed a ridge 47 is formed at the intersection of the tread portion 44 and each of the sidewalls 45 and 46. The sensors 40 each have a pair of rollers 48 and 49 for rolling engagement with the piece of tread stock 10, and include a limit switch 50 which is actuated as the forward roller 48 approaches the closest ridge 47. The limit switches 50 control movement of the L–P assemblies 39 along their trackways 42. Each of the limit switches 50 also controls operation of an air cylinder 52 for plunging the pointed awl 41 downward into piercing relation, preferably with the intermediate tread portion 44 of the piece of tread stock 10. The spacing between each of the awls 41 and its associated sensor 40 may be varied by any suitable means, e.g., a lock screw or adjusting nut 53, to accommodate different size pieces of tread stock. It is desirable that the awls 41 pierce the piece of tread stock 10 as close to the longitudinal centerline of the tread portion 44 as possible. The ridges 47 are generally parallel to the longitudinal axis of the piece of tread stock 10. Each of the L-P assemblies 39 are moved along their respective trackways 42 by any suitable means such as a conventionally designed combination air and hydraulic cylinder assembly 54, including an air cylinder 55 operating in conjunction with a hydraulic check cylinder 56.

Each of the L–P assemblies 39 carries an elongated actuator bar 57 having a predetermined length and a pair of configured ends 58 and 59 for engaging a set of limit switches 60 and 61 which closely straddles the actuator 57, when the awl 41 is in a centered position coincidental with the longitudinal axis of the feed conveyor 23, and regulate the position of the awl 41 relative to the longitudinal axis of the feed conveyor 23.

OPERATION OF THE APPARATUS

Assuming the components of the machine 9 are in their normally home or rest positions where the clamps 25 and 26 are in farthest spaced relation from the conveyor bed 24, and the sensor 40 and awl 41 of each L–P assembly 39 are in farthest spaced relation from their operating cylinder assemblies 54, a piece 70 of discarded, unoriented tread stock moves from an adjacent discharge conveyor 71 on to the feed conveyor 23.

Any suitable sensing device, e.g., opposing electric eyes 72 and 73, is provided for sensing movement of the piece 70 of tread stock from the discharge conveyor 71 and actuating a timer for stopping operation of the feed and discharge conveyors 23 and 71 after the piece of tread stock moves on to the feed conveyor 23 a predetermined distance. The positions of the electric eyes 72 and 73 are adjustable adjacent the end 74 of the discharge conveyor 71 by any suitable means. For example, the electric eyes 72 and 73 are each slidably mounted for movement along a guide rod 75 secured between a pair of brackets 76 and 77 which are fastened in spaced relation on opposing sides 78 and 79 of the discharge conveyor 71. Thus, the position of the electric eyes 72 and 73 relative to the adjacent end 80 of the feed conveyor 23 can be varied, such that the individual pieces of tread stock will move on to the feed conveyor 23 a predetermined distance before the electric beam set up between the opposing eyes 72 and 73 is completed and remains unbroken. The electric eyes 72 and 73 act to stop operation of the feed conveyor 23 and adjacent discharge conveyor 71, when the piece 70 of tread stock moves the predetermined distance on to the feed conveyor 23. Moreover, the electric eyes 72 and 73 actuate operation of the clamps 25 and 26 for moving downward into compressive clamping engagement with the piece 70 of tread stock which is, generally, centrally positioned relative to the spaced clamps 25 and 26.

The air-hydraulic cylinder assemblies 54, controlling operation of the L-P assemblies 39, are actuated after the clamps 25 and 26 engage the piece 70 of tread stock. Each of the sensors 40 moves separately along its trackway 42 until it engages or senses the distinguishable physical characteristic of the piece 70 of tread stock held in position on the stationary feed conveyor 23. As best seen in FIG. 3, the rollers 48 and 49, of the sensor 40, move upwards along the closest sidewall portion 45 towards the physical characteristic or ridge 47 formed between the tread portion 44 and each of the sidewalls 45 and 46. The rearward wheel 49 of each sensor 40 actuates the limit switch 50 when the forward wheel 48 engages the ridge 47. The limit switches 50 act to stop movement of the L–P assemblies 39 and actuates operation of the air cylinders 52 for moving the awls 41 downward into piercing engagement with the piece 70 of tread stock (note dotted position of awl 41 in piercing relation with the center tread portion 44).

As previously indicated, the L-P assemblies 39 are separately movable which is necessary for locating the piece 70 of tread stock, since the piece 70 of tread stock is generally angularly disposed on the conveyor bed 24 relative to the longitudinal axis of the feed conveyor 23. The operation of the apparatus 9 is not continued, until the last awl 41 has engaged the piece 70 of tread stock, after which the clamps 25 and 26 are retracted and disengaged from the piece of tread stock 70 and the combination air-hydraulic cylinder assemblies 54 are further actuated to move the L-P assemblies 39 to their centering positions where the awls 41 are in parallel, and preferably coincidental alignment, with the longitudinal axis of the feed conveyor 23. It can be appreciated that each of the actuator bars 57 must be in actuating relation with one of the associated limit switches 60 and 61 when the awls 41 are in pierced engagement with the piece 70 of tread stock. The location of the L-P assemblies 39 on their respective trackways 42 and the direction in which they must move to correspondingly move the awls 41 to their center positions where the piece 70 of tread stock is properly oriented for passage from the feed conveyor 23 through the adjacent tread slitter, is determined by which switch 60 or 61 is engaged. Thus, the awls 41 (FIG. 4) are each moved in a direction towards the longitudinal centerline of the feed conveyor 23 to their center positions where the piece of tread stock 70 is in parallel, and preferably coaxial, relation with the longitudinal axis of the feed conveyor 23. The actuator bar 57 of each of the L–P assemblies 39 will be centrally positioned between the limit switches 60 and 61 when the awls 41 are positioned for properly aligning the piece of tread stock 70 on the feed conveyor 23. The drive rollers 19 of the feed conveyor 23 are operated as the awls 41 are moved to their tread stock orienting positions, since this facilitates rotation of the piece 70 of tread stock about the two spaced pivots or awls 41. The drive rollers 19 are stopped when the awls 41 are in their proper center positions.

The air cylinders 52 are deactivated to retract the awls 41 from the piece 70 of tread stock, thereby permitting removal of the piece of tread stock from the feed conveyor 23. The feed conveyor 23 and discharge conveyor 71 are operated simultaneously to move the properly oriented piece 70 of tread stock from the feed conveyor 23 and move a new, unoriented piece of tread stock from the discharge conveyor 71 on to the feed conveyor 23 for proper alignment. Simultaneously, the L-P assemblies 39 are moved back to their rest positions for reactivation after the new piece of tread stock is firmly clamped on the feed conveyor 23.

Thus, there has been described a machine or apparatus for taking unoriented, discarded pieces of tread stock and properly positioning them for movement through a tread slitter where the rubber of the sidewalls and treads are separated and returned to an extruding machine for reforming into a band or ribbon of tread stock.

While certain representative embodiments and details have been shown for the purpose of illustrating the invention, it will be apparent to those skilled in the art that various changes and modifications may be made therein without departing from the spirit or scope of the invention.

What is claimed is:

1. An apparatus for aligning a piece of material, comprising:
   a. a conveyor for supporting a piece of material as it moves through the apparatus;
   b. means for clamping the piece of material in stationary relation on the conveyor after it moves a predetermined distance along the conveyor;
   c. a pair of sensors, separately movable along parallel axes angularly disposed to the longitudinal axis of the conveyor, for sensing a distinguishable, physical characteristic of the piece of material;
   d. an awl movable, in unison, with each of the sensors, the awls being equally spaced from the sensors;
   e. means for driving the awls into plunging, piercing relation with the piece of material when the sensors sense the physical characteristic of the piece of material;
   f. means for unclamping the piece of material from the conveyor when the awls pierce the piece;
   g. means for individually moving the awls to positions where the awls are in aligned, parallel relation to the longitudinal axis of the conveyor, when the piece of material is unclamped from the conveyor and after the awls pierce the piece of material; and
   h. means for retracting the awls from the piece of material when the awls are in said position.

2. The apparatus of claim 1, wherein the clamping and unclamping means includes at least one clamp angularly disposed to the longitudinal axis of the conveyor, and means for actuating the clamp into and out of engagement with the piece of material.

3. The apparatus of claim 2, which includes means for stopping operation of the conveyor prior to actuating the clamp.

4. The apparatus of claim 3, wherein the sensors move along axes parallel to the angular disposition of the clamp.

5. The apparatus of claim 4, which includes means for operating the conveyor as the awls move to said positions to help rotate the piece of material.

6. The apparatus of claim 5, wherein the sensors and awls move along parallel axes.

7. The apparatus of claim 6, which includes means for varying the spacing between the awls and the sensors.

8. The apparatus of claim 7, wherein each sensor includes a finger for gliding relation over the piece of material, and means for actuating movement of the awls when the fingers contact the physical characteristic which the fingers are set to sense.

9. The apparatus of claim 8, wherein the awls move in opposing directions towards said positions and means are provided for determining the direction of movement of said awls.

10. The apparatus of claim 9, wherein the clamping and unclamping means includes a set of clamps extending transversely over the conveyor in parallel relation.

11. An apparatus for aligning an elongated piece of material having a physical characteristic, comprising:
   a. means for sensing the physical characteristic of the piece;
   b. means coacting with the sensing means for engaging the piece when the physical characteristic is sensed and at a pair of pivot points which are equally spaced from the longitudinal axis of the piece;
   c. means coacting with the piece engaging means when the piece is engaged, for moving the pivot points and rotating the engaged piece to a properly oriented position for passage from the apparatus; and
   d. means coacting with the moving and rotating means for disengaging the piece engaging means from the piece of material when the piece is in said position.

12. The apparatus of claim 11, which includes:
   e. means for holding the piece in a stopped position after the piece moves a predetermined distance through the apparatus.

13. The apparatus of claim 12, wherein the sensing means includes a pair of sensors movable in parallel relation transversely across a piece held in a stopped position.

14. The apparatus of claim 13, wherein the means for engaging the piece includes a pointed awl movable, in unison, with each of the pair of sensors, and means for plunging the awl into piecing relation with the piece after the sensors locate the physical characteristic.

15. The apparatus of claim 14, which includes a conveyor for supporting the piece as it moves through the apparatus.

16. The apparatus of claim 15, wherein the means for rotating the engaged piece includes means for moving the awls independently of each other to positions where the awls are in coaxial relation with the conveyor.

17. A method of moving an elongated piece of material from an undesirable position to a desirable position for subsequent movement along a predetermined axis, comprising the steps of:
   a. sensing a physical characteristic of the piece of material when the piece is in the undesirable position;
   b. grabbing the piece of material, in said undesirable position, at two points which are equally spaced from the longitudinal axis of the piece of material;
   c. exerting a force upon the piece of material through the pivot points to rotate the piece to the desired position; and
   d. disengaging the piece of material when the piece is in the desired position, such that the piece is free to move along the predetermined axis.

* * * * *